United States Patent
Niikura et al.

(10) Patent No.: US 12,428,745 B2
(45) Date of Patent: Sep. 30, 2025

(54) METHOD AND SYSTEM FOR ELECTROPLATING PARTS WITH METAL

(71) Applicant: DIPSOL CHEMICALS CO., LTD., Tokyo (JP)

(72) Inventors: Toshihiro Niikura, Livonia, MI (US); Alec Chaffee, Livonia, MI (US); Tarek Nahlawi, Livonia, MI (US); Shuntaro Tsukiyama, Livonia, MI (US)

(73) Assignee: DIPSOL CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 18/029,616

(22) PCT Filed: Jan. 21, 2022

(86) PCT No.: PCT/JP2022/002164
§ 371 (c)(1),
(2) Date: Jun. 8, 2023

(87) PCT Pub. No.: WO2023/100381
PCT Pub. Date: Jun. 8, 2023

(65) Prior Publication Data
US 2023/0349063 A1 Nov. 2, 2023

Related U.S. Application Data

(60) Provisional application No. 63/285,433, filed on Dec. 2, 2021.

(51) Int. Cl.
C25D 5/02 (2006.01)
C25D 3/22 (2006.01)
C25D 5/52 (2006.01)

(52) U.S. Cl.
CPC .............. *C25D 5/022* (2013.01); *C25D 3/22* (2013.01); *C25D 5/52* (2013.01)

(58) Field of Classification Search
None
See application file for complete search history.

(56) References Cited

U.S. PATENT DOCUMENTS

| | | | |
|---|---|---|---|
| 4,441,975 A * | 4/1984 | Carter | C25D 7/0642 204/224 R |
| 6,717,236 B1 * | 4/2004 | Lopatin | C25D 17/001 257/586 |
| 2002/0063064 A1 * | 5/2002 | Landau | C25D 3/38 205/296 |
| 2003/0150715 A1 * | 8/2003 | Yahalom | C25D 7/123 204/229.1 |
| 2006/0102467 A1 * | 5/2006 | Herchen | C25D 17/008 204/230.2 |
| 2006/0226002 A1 * | 10/2006 | Mobius | C25D 17/12 205/261 |
| 2017/0022621 A1 | 1/2017 | Niikura et al. | |
| 2017/0022625 A1 | 1/2017 | Niikura et al. | |
| 2020/0263314 A1 | 8/2020 | Niikura et al. | |

FOREIGN PATENT DOCUMENTS

| | | | |
|---|---|---|---|
| CN | 101360851 A | 2/2009 | |
| CN | 105593412 A | 5/2016 | |
| JP | H04-044373 U1 | 4/1992 | |
| JP | H05-331696 A | 12/1993 | |
| JP | H10-330998 A | 12/1998 | |
| JP | 2003-272638 A | 9/2003 | |
| JP | 2006-503187 A | 1/2006 | |
| JP | 2019-530800 A | 10/2019 | |
| JP | 6582353 B1 | 10/2019 | |
| KR | 102160807 B1 * | 9/2020 | ............. C25D 17/12 |
| TW | 201014930 A | 4/2010 | |
| TW | 201018753 A1 | 2/2013 | |
| WO | WO-2016/075963 A1 | 5/2016 | |
| WO | WO-2016/075964 A1 | 5/2016 | |

OTHER PUBLICATIONS

International Search Report and Written Opinion issued for PCT Appl. Ser. No. PCT/JP2022/002164 dated Mar. 22, 2022 (8 pages).
Menard et al., "Influence of Shielded Insoluble Anode Layout on the Consumption of Bath Additives", Transactions of the Institute of Metal Finishing, vol. 87, No. 6, pp. 290-293, Nov. 1, 2009.
Office Action for Canadian Patent Application No. 3.238.810, dated Jun. 17, 2024, 4 pages.

* cited by examiner

*Primary Examiner* — Louis J Rufo
(74) *Attorney, Agent, or Firm* — Foley & Lardner LLP

(57) ABSTRACT

An object of the present invention is to provide a method and system of electroplating using an anode that can be prepared relatively easily without the need for ancillary equipment or anolyte management, and without the need for expensive metals or special metals.

The present invention relates to a method of electroplating an article with metal, the method comprising the steps of:
allowing a current to flow in a plating bath containing ions of the metal and an organic compound additive, wherein
the plating bath comprises the article as a cathode and a conductive base material as an anode,
a part of a surface of the conductive base material is covered with an insulating material, and a remaining part is exposed, and
a current flowing portion is dispersedly present in the anode.

5 Claims, No Drawings

METHOD AND SYSTEM FOR ELECTROPLATING PARTS WITH METAL

This application is a U.S. National Phase Application under 35 U.S.C. § 371 of International Application No. PCT/JP2022/002164, filed on Jan. 21, 2022, which claims the benefit of and priority to U.S. Provisional Appl. No. 63/285,433 filed Dec. 2, 2021, the contents of each of which is incorporated herein by reference in their entirety for any and all purposes.

TECHNICAL FIELD

The present invention relates to a method and a system of electroplating an article with metal, and also relates to an electrode suitable for the method and the system as well as a method for preparing the same.

BACKGROUND ART

When electroplating is performed using a plating bath containing an organic compound additive, the organic compound additive is oxidatively decomposed on the surface of the anode by a current flow, and finally electrolytic waste products such as oxalic acid and sodium carbonate are accumulated. Accumulation of these electrolytic waste products adversely affects the performance of electroplating (such as appearance, plating rate, metal eutectoid rate, and plating bath resistance), and therefore it is required to suppress the oxidative decomposition of the organic compound additive.

Patent Literatures 1 and 2 describe a so-called anode cell system that can suppress the decomposition of organic compound additives by putting an anolyte in a cell covered with a diaphragm and partitioning the plating bath so that it does not come into contact with the anode plate. In this anode cell system, oxalic acid and sodium carbonate generated in the plating bath move from the plating solution into the anode cell, and thus the effect of removing decomposition products in the plating bath is also expected. On the other hand, the anode cell system requires a lot of ancillary equipment such as anode cell bodies, pipes, and pumps. Furthermore, it is necessary to control the concentration of the anolyte, and it is necessary to update the anolyte at regular current flow rates.

Patent Literatures 3 and 4 state that the decomposition of organic compound additives is suppressed by coating the entire surface of the conductive base material of the anode. In this case, no ancillary equipment or extreme liquid management is required, but improvement in the cost for manufacturing the anode and improvement in the performance of electroplating are still required.

On the other hand, Patent Literature 5 describes a porous member used for an electrode of a fuel cell or the like, and the porous member is formed by laminating a specific metal porous body and a water-repellent organic porous body membrane, and the metal porous body is exposed on a part of the surface of the organic porous body membrane. However, there is no statement that it will be used for electroplating anodes.

CITATION LIST

Patent Literature

[Patent Literature 1] International Publication No. WO2016/075963

[Patent Literature 2] International Publication No. WO2016/075964

[Patent Literature 3] Japanese Patent No. 6582353

[Patent Literature 4] Japanese Patent Application Publication No. 1993-331696

[Patent Literature 5] Japanese Patent Application Publication No. 2003-272638

SUMMARY OF INVENTION

Technical Problems

An object of the present invention is to provide a method and system of electroplating using an anode that can be prepared relatively easily without the need for ancillary equipment or anolyte management, and without the need for expensive metals or special metals.

Solution to Problems

The present inventors have made earnest studies to achieve the above object, and have found as a result that it is possible to suppress the decomposition of organic compound additives in a plating bath if, when electroplating an article with metal, a conductive base material is used as the anode, part of the surface of which is covered with an insulating material but the remaining part is exposed. Then, the present invention has been completed. That is, the present invention provides a method and a system of electroplating an article with metal shown below, as well as a method of preparing an electrode, and an electrode.

[1] A method of electroplating an article with metal, comprising the step of:
  allowing a current to flow in a plating bath containing ions of the metal and an organic compound additive,
  in which the plating bath comprises the article as a cathode and a conductive base material as an anode,
  a part of a surface of the conductive base material is covered with an insulating material, and a remaining part is exposed, and
  a current flowing portion is dispersedly present in the anode.

[2] The method according to [1], in which the conductive base material has a plurality of holes dispersed therein, and/or an outer surface of the conductive base material is covered with a layer of the insulating material having a plurality of missing portions dispersed therein.

[3] The method according to [1] or [2], in which the conductive base material comprises a porous metal, a perforated steel plate, or a perforated folded plate.

[4] The method according to any one of [1] to [3], in which the conductive base material comprises at least one selected from the group consisting of nickel, iron, titanium, copper, stainless steel, and carbon.

[5] The method according to any one of [2] to [4], in which an inner wall surface of the holes in the conductive base material is covered with the insulating material.

[6] The method according to any one of [1] to [5], in which the insulating material comprises at least one selected from the group consisting of resins, rubbers, insulating inorganic oxides, insulating inorganic nitrides, insulating inorganic carbides, and insulating inorganic borides.

[7] The method according to any one of [1] to [6], in which the metal comprises zinc.

[8] The method according to any one of [1] to [7], in which the plating bath is an alkaline plating bath.

[9] A system of electroplating an article with metal, comprising: a plating bath containing ions of the metal and an organic compound additive,
   in which the plating bath comprises the article as a cathode and a conductive base material as an anode, a part of a surface of the conductive base material is covered with an insulating material, and a remaining part is exposed, and
   a current flowing portion is dispersedly present in the anode.

[10] The system according to [9], in which the conductive base material has a plurality of holes dispersed therein, and/or an outer surface of the conductive base material is covered with a layer of the insulating material having a plurality of missing portions dispersed therein.

[11] The system according to [9] or [10], in which the conductive base material comprises a porous metal, a perforated steel plate, or a perforated folded plate.

[12] The system according to any one of [9] to [11], in which the conductive base material comprises at least one selected from the group consisting of nickel, iron, titanium, copper, stainless steel, and carbon.

[13] The system according to any one of [10] to [12], in which an inner wall surface of the holes in the conductive base material is covered with the insulating material.

[14] The system according to any one of [9] to [13], in which the insulating material comprises at least one selected from the group consisting of resins, rubbers, insulating inorganic oxides, insulating inorganic nitrides, insulating inorganic carbides, and insulating inorganic borides.

[15] The system according to any one of [9] to [14], in which the metal comprises zinc.

[16] The system according to any one of [9] to [15], in which the plating bath is an alkaline plating bath.

[17] A method of preparing an electrode, comprising the steps of:
   providing a conductive base material having a plurality of holes dispersed therein;
   immersing the conductive base material in a coating solution containing an insulating material to attach the insulating material to an outer surface of the conductive base material and an inner wall surface of the holes; and
   peeling off at least a part of the insulating material attached to the outer surface of the conductive base material.

[18] The preparation method according to [17], in which the step of peeling off at least a part of the insulating material comprises a step of polishing the outer surface of the conductive base material.

[19] An electrode comprising a conductive base material whose surface is partially covered with an insulating material,
   in which the conductive base material has a plurality of holes dispersed therein, an inner wall surface of the holes is covered with the insulating material, and
   at least a part of an outer surface of the conductive base material is exposed, and a current flowing portion is dispersedly present.

[20] The electrode according to claim [19], in which the outer surface of the conductive base material is not covered with the insulating material.

According to the present invention, it is possible to suppress the decomposition of organic compound additives in a plating bath if, when electroplating an article with metal, a conductive base material is used as the anode, part of the surface of which is covered with an insulating material but the remaining part is exposed.

DESCRIPTION OF EMBODIMENTS

Hereinafter, the present invention is described in more detail.

The present invention relates to a method of electroplating an article with metal. The metal is not particularly limited as long as it is used for electroplating, and for example, the metal may comprise zinc, nickel, iron, copper, cobalt, tin, manganese, and the like. If the metal is only zinc, a zinc film is formed on the article, and if the metal comprises zinc and a different metal, a zinc alloy film is formed on the article. The different metal is not particularly limited as long as it can form the zinc alloy film, but may be at least one selected from the group consisting of nickel, iron, cobalt, tin, and manganese, for example. The zinc alloy film is not particularly limited, and may be, for example, zinc nickel alloy plating, zinc iron alloy plating, zinc cobalt alloy plating, zinc manganese alloy plating, tin zinc alloy plating, or the like, and preferably zinc nickel alloy plating.

The article is an object to be plated, and those usually used in the art can be employed without particular limitation. The article may be, for example, various metals such as iron, nickel, copper, zinc, aluminum, and alloys thereof. Further, the shape thereof is not particularly limited, and includes various ones, for example, plate-shaped objects such as steel plates and plated steel plates, and shaped objects such as rectangular parallelepipeds, columns, cylinders, and spherical objects. Specific examples of the shaped objects include fastening parts such as bolts, nuts, and washers, pipe parts such as fuel pipes, cast-iron parts such as brake calipers and common rails, as well as various other items such as connectors, plugs, housings, mouthpieces, and seatbelt anchors.

A method of the present invention comprises allowing a current to flow in a plating bath containing ions of metal to be plated and an organic compound additive, wherein the plating bath comprises the article as a cathode and a conductive base material as an anode. The plating bath is not particularly limited, but may be either an acidic plating bath such as a sulfuric acid bath, a borofluoride bath, and an organic acid bath, or an alkaline plating bath such as a cyanide bath, a zincate bath, and a pyrophosphate bath, and preferably an alkaline plating bath.

In the method of the present invention, a part of a surface of the conductive base material is covered with an insulating material, and a remaining part is exposed, and a current flowing portion is dispersedly present in the anode. For example, a layer of the insulating material does not have to be continuous on the surface of the conductive base material. More specifically, the layer of the insulating material comprises a plurality of missing portions dispersedly. As a result of covering an outer surface of the conductive base material with such a layer, the conductive base material may be exposed at the missing portions and allow a current to flow there. The method of forming the missing portions is not particularly limited. For example, the missing portions may be formed by attaching the insulating material to the surface of the conductive base material and then peeling off at least a part thereof. Alternatively, the missing portions may be formed by forming a layer of the insulating material that has been subjected to patterning processing or crack processing (specifically, preparing a single-sided adhesive sheet with the insulating material and making a cut with a punch or a cutter to attach it to the outer surface of the conductive base material, or after covering a part of the outer surface of the conductive base material with a masking material, attaching the insulating material to the surface of the conductive base material and peeling off the masking material after drying). Alternatively, when the conductive base material originally has a shape dispersedly having current flowing portions, more specifically, when the conductive base material has a plurality of holes dispersed therein, by immersing the conductive base material in a coating solution containing the insulating material and attaching the insulating material to the outer surface thereof and the inner wall surface of the holes, and then peeling off at least a part of the insulating material attached to the outer surface of the conductive base material, the area of the entire current flowing portions may be reduced while utilizing the current flowing portions originally dispersed on the outer surface.

The ratio of the area of the current flowing portions in the anode is not particularly limited as long as electroplating can be performed, and may be, for example, about 1% to about 30%, and preferably about 5% to about 15%, based on the outer surface area of the current flowing region calculated based on the external dimensions of the conductive base material (if the conductive base material has holes therein, the surface area of the outer current flow region assuming that all the holes are filled). The ratio of the area of the current flowing portions in the anode may also depend on the shape of the conductive base material described later. For example, when the conductive base material has a plurality of holes (such as pores, depressions, gaps, or through holes) dispersed therein, after immersing the conductive base material in a coating solution containing the insulating material and attaching the insulating material to the outer surface thereof and the inner wall surface of the holes, and then peeling off the insulating material attached to the outer surface of the conductive base material over the entire surface, the current flowing portions exposed thereby correspond to portions of the outer surface that are not the holes, and in the holes, the inner wall surface thereof is covered with the insulating material, or the lumen thereof is filled with the insulating material to form non-current flowing portions. That is, if the area of the hole portions in the outer surface area of the current flowing region is large, the area of the current flowing portions finally formed becomes small. Note that the current flowing portions have a metallic color and can be distinguished from the portion covered with the insulating material by the color tone. Therefore, for example, the ratio of the area of the current flowing portions may be calculated by analyzing an image of the anode with image analysis software and obtaining the ratio of the area of the metallic color portion to the outer surface area of the current flow region of the conductive base material.

The shape of the conductive base material is not particularly limited as long as it can be used as the anode of the plating bath, but may be, for example, flat plate-shaped, rod-shaped, or pinholder-shaped. Further, when the conductive base material has a plurality of holes dispersed therein, the conductive base material may comprise, for example, a porous metal, a perforated steel plate, or a perforated folded plate. That is, the holes that may exist in the conductive base material may be porous pores or depressions, or may be stepped or meshed gaps or through holes. More specifically, the porous metal may be "Ni Celmet" manufactured by Sumitomo Electric Industries, Ltd., or "Nickel Foam," "Nickel Iron Foam," "Nickel Copper Foam," or "Tantalum Foam" manufactured by AMERICAN ELEMENTS, or the like. The perforated steel plate may be a punched metal plate, a grated metal plate, or an expanded metal plate, and the perforated folded plate may be one obtained by bending such a perforated steel plate. In certain embodiments, the inner wall surface of the holes in the conductive base material may be covered with the insulating material, or the lumen of the holes in the conductive material may be filled with the insulating material.

The composition of the conductive base material is not particularly limited as long as a current can be allowed to flow therethrough, and for example, the conductive base material may comprise at least one selected from the group consisting of nickel, iron, titanium, copper, stainless steel, carbon, zirconium, niobium, tantalum, platinum, palladium-tin alloys, and base materials coated therewith (such as platinum-plated titanium). When the plating bath is an alkaline plating bath, the conductive base material may comprise at least one selected from the group consisting of nickel, iron, titanium, copper, stainless steel, carbon, and the like.

The insulating material is not particularly limited as long as it can be used in the plating bath, and may comprise, for example, at least one selected from the group consisting of polymer resins, rubbers, insulating inorganic oxides, insulating inorganic nitrides, insulating inorganic carbides, and insulating inorganic borides. More specifically, the polymer resins may comprise epoxy resin, vinyl chloride resin, melamine resin, phenol resin, fluororesin acrylic resin, polystyrene, ABS (acrylonitrile/butadiene/styrene) resin, polyethylene, polypropylene, nylon polyurethane, methylpentene resin, polycarbonate, and the like, the rubbers may comprise silicone rubber, fluororubber, urethane rubber, acrylic rubber, nitrile rubber, ethylene/propylene rubber, styrene rubber, butyl rubber, butadiene rubber, natural rubber, and the like, and the insulating inorganic oxides may comprise silicon dioxide, magnesium oxide, zinc oxide, beryllium oxide, titanium oxide, tantalum oxide, and the like.

Without wishing to be bound by a specific theory, it is considered that the oxygen evolution reaction and the decomposition reaction of the organic compound additive occur at the same time due to the oxidation reaction in the vicinity of the anode. Limiting the area of the current flowing portions of the conductive base material used as the electrode increases the anode current density (current per unit current flowing portion area of the anode). In this state, the oxygen evolution reaction takes precedence over the decomposition reaction of the organic compound additive as compared with the case where the anode current density is low. Thus, it is considered that the decomposition of the organic compound additive is suppressed. Further, it is considered that when the current flowing portions at the anode are dispersed, the current distribution with respect to the cathode can be kept stable by suppressing the increase in the plating bath voltage. If a conventional flat plate anode is used as an anode and an attempt is made to increase the anode current density without changing the area of the current flowing portions, it is necessary to significantly increase the applied current, but then the bath voltage also rises, which is uneconomical and can affect the durability of the anode. Furthermore, if the applied current is significantly increased, the cathode current density is also significantly increased, which may adversely affect the plating quality. By using the anode defined by the present invention, the anode current density can be increased without such disadvantages, and the decomposition of the organic compound additive can be suppressed.

The anode current density in the current flow step of the method of the present invention is not limited as long as electroplating can be performed, and can be appropriately adjusted within a range in which the bath voltage takes an appropriate value. For example, when the conductive base material comprises a porous metal, the anode current density may be about 30 A/dm² to about 300 A/dm², and preferably about 50 A/dm² to about 100 A/dm². By adjusting the anode current density to such a range, it is possible to suitably suppress the decomposition of the organic compound additive while suppressing the deterioration of the anode.

As used herein, the term "organic compound additive" refers to an organic compound added in a plating bath for electroplating. The type of the organic compound additive is not particularly limited, but for example, when zinc plating is performed, the organic compound additive may be at least one selected from the group consisting of brighteners, auxiliary additives (such as smoothing agents), defoamers, and the like, and when zinc alloy plating is performed, the organic compound additive may be at least one selected from the group consisting of amine-based chelating agents, brighteners, auxiliary additives (such as smoothing agents), defoamers, and the like. In any case, in a preferred embodiment, the organic compound additive comprises a brightener.

As the brightener, those usually used in the art can be employed without particular limitation, and for example, the brightener may comprise (1) nonionic surfactants such as polyoxyethylene polyoxypropylene block polymer and acetylene glycol EO adduct, and anionic surfactants such as polyoxyethylene lauryl ether sulfate and alkyl diphenyl ether disulfonate; (2) polyamine compounds such as; polyallylamines such as a copolymer of diallyldimethylammonium chloride and sulfur dioxide; polyepoxy polyamines such as a condensation polymer of ethylenediamine and epichlorohydrin, a condensation polymer of dimethylaminopropylamine and epichlorohydrin, a condensation polymer of imidazole and epichlorohydrin, a condensation polymer of an imidazole derivative such as 1-methylimidazole or 2-methylimidazole and epichlorohydrin, and a condensation polymer of epichlorohydrin and complex cyclic amine containing triazine derivatives such as acetoguanamine and benzoguanamine; polyamine polyurea resins such as a condensation polymer of 3-dimethylaminopropyl urea and epichlorohydrin, and a condensation polymer of bis(N,N-dimethylaminopropyl) urea and epichlorohydrin, and polyimide polyamines such as water-soluble nylon resins such as a condensation polymer of N,N-dimethylaminopropylamine, alkylenedicarboxylic acid, and epichlorohydrin; and polyalkylene polyamines such as a condensation polymer of diethylenetriamine, dimethylaminopropylamine or the like, and 2,2'-dichlorodiethyl ether, a condensation polymer of dimethylaminopropylamine and 1,3-dichloropropane, a condensation polymer of N,N,N',N'-tetramethyl-1,3-diaminopropane and 1,4-dichlorobutane, and a condensation polymer of N,N,N',N'-tetramethyl-1,3-diaminopropane and 1,3-dichloropropane-2-ol; (3) a condensation polymer of dimethylamine or the like and dichloroethyl ether; (4) aromatic aldehydes such as veratraldehyde, vanillin, and anisaldehyde, benzoic acid, or salts thereof; and (5) quaternary ammonium salts such as cetyltrimethylammonium chloride, 3-carbamoylbenzyl chloride, and pyridinium, and the like. Preferably, the brightener comprises a quaternary ammonium salt or an aromatic aldehyde. The brightener may be used alone or in combination of two or more kinds. The concentration of the brightener in the plating bath is not particularly limited, but for example, in the case of an aromatic aldehyde, benzoic acid, or a salt thereof, it may be about 1 to about 500 mg/L, and preferably about 5 to about 100 mg/L, and in other cases, it may be about 0.01 to about 10 g/L, and preferably about 0.02 to about 5 g/L.

Alternatively, the brightener may comprise a nitrogen-containing heterocyclic quaternary ammonium salt in addition to the quaternary ammonium salts having no nitrogen-containing heterocycle. Preferably, the nitrogen-containing heterocyclic quaternary ammonium salt is a nitrogen-containing heterocyclic quaternary ammonium salt having a carboxy group and/or a hydroxy group. The nitrogen-containing heterocycle of the nitrogen-containing heterocyclic quaternary ammonium salt is not particularly limited, and may be, for example, a pyridine ring, a piperidine ring, an imidazole ring, an imidazoline ring, a pyrrolidine ring, a pyrazole ring, a quinoline ring, a morpholine ring, or the like, and preferably a pyridine ring. More preferably, the nitrogen-containing heterocyclic quaternary ammonium salt is a quaternary ammonium salt of nicotinic acid or a derivative thereof. In the nitrogen-containing heterocyclic quaternary ammonium salt compounds, the carboxy group and/or the hydroxy group may be directly bonded to the nitrogen-containing heterocycle, or may be bonded via another substituent such as a carboxymethyl group. The nitrogen-containing heterocyclic quaternary ammonium salt may have an additional substituent such as an alkyl group in addition to the carboxy group and the hydroxy group. Further, in the nitrogen-containing heterocyclic quaternary ammonium salts, the N-substituent forming heterocyclic quaternary ammonium cations is not particularly limited as long as the effect as a brightener is not impaired, and may be, for example, a substituted or unsubstituted alkyl group, an aryl group, an alkoxy group, or the like. The counter anion forming the salt is not particularly limited, but may be, for example, a compound containing a halogen anion, an oxy anion, a borate anion, a sulfonate anion, a phosphate anion, an imide anion, or the like, and is preferably a halogen anion. Since such a quaternary ammonium salt is preferable because it contains both a quaternary ammonium cation and an oxyanion in the molecule, and thus exhibits behavior as an anion as well.

Specifically, the nitrogen-containing heterocyclic quaternary ammonium salt may be, for example, N-benzyl-3-carboxypyridinium chloride, N-phenethyl-4-carboxypyridinium chloride, N-butyl-3-carboxypyridinium bromide, N-chloromethyl-3-carboxypyridinium bromide, N-hexyl-6-hydroxy-3-carboxypyridinium chloride, N-hexyl-6-3-hydroxypropyl-3-carboxypyridinium chloride, N-2-hydroxyethyl-6-methoxy-3-carboxypyridinium chloride, N-methoxy-6-methyl-3-carboxypyridinium chloride, N-propyl-2-methyl-6-phenyl-3-carboxypyridinium chloride, N-propyl-2-methyl-6-phenyl-3-carbopyridinium chloride, N-benzyl-3-carboxymethylpyridinium chloride, 1-butyl-3-methyl-4-carboxyimidazololium bromide, 1-butyl-3-methyl-4-carboxymethylimidazolium bromide, 1-butyl-2-hydroxymethyl-3-methylimidazolium chloride, 1-butyl-1-methyl-3-methylcarboxypyrrolidinium chloride, 1-butyl-1-methyl-4-methylcarboxypiperidinium chloride, or the like. The nitrogen-containing heterocyclic quaternary ammonium salt may be used alone or in combination of two or more kinds. The concentration of the nitrogen-containing heterocyclic quaternary ammonium salt in the plating bath is not particularly limited, but may be, for example, about 0.01 to about 10 g/L, and preferably 0.02 to 5 g/L.

As the auxiliary additive, those usually used in the art can be employed without particular limitation, and for example, the auxiliary additive may comprise an organic acid, a silicate, a mercapto compound, or the like, and these can be used as smoothing agents. The auxiliary additive may be used alone or in combination of two or more kinds. The concentration of the auxiliary additive in the plating bath is not particularly limited, but may be, for example, about 0.01 to about 50 g/L.

As the defoamer, those usually used in the art can be employed without particular limitation, but for example, the defoamer may be a surfactant or the like. The defoamer may be used alone or in combination of two or more kinds. The concentration of the defoamer in the plating bath is not particularly limited, but may be, for example, about 0.01 to about 5 g/L.

As the amine-based chelating agent, those usually used in the art can be employed without particular limitation, and for example, the amine-based chelating agent may comprise alkyleneamine compounds such as ethylenediamine, diethylenetriamine, triethylenetetramine, tetraethylenepentamine, and pentaethylenehexamine; alkylene oxide adducts such as ethylene oxide adducts and propylene oxide adducts of the alkyleneamines; amino alcohols such as ethanolamine, diethanolamine, triethanolamine, diisopropanolamine, triisopropanolamine, ethylenediaminetetra-2-propanol, N-(2-aminoethyl) ethanolamine, and 2-hydroxyethylaminopropylamine; alkanolamine compounds such as N-(2-hydroxyethyl)-N,N,N-triethylethylenediamine, N,N'-di(2-hydroxyethyl)-N,N'-diethylethylenediamine, N,N,N',N'-tetrakis(2-hydroxyethyl) propylenediamine, and N,N,N',N'-tetrakis(2-hydroxypropyl)ethylenediamine; poly(alkyleneimine) obtained from ethyleneimine, 1,2-propyleneimine, and the like; poly(alkyleneamine) obtained from ethylenediamine, triethylenetetramine, and the like. Preferably, the amine-based chelating agent comprises at least one selected from the group consisting of alkyleneamine compounds, alkylene oxide adducts thereof, and alkanolamine compounds. The amine-based chelating agent may be used alone or in combination of two or more kinds. The concentration of the amine-based chelating agent in the plating bath is not particularly limited, but may be, for example, about 5 to about 200 g/L, and preferably about 30 to about 100 g/L.

In some embodiments, the plating bath, in particular the alkaline plating bath, contains zinc ions. As the ion source that brings about the zinc ions, those usually used in the art can be employed without particular limitation, and it may be, for example, $Na_2[Zn(OH)_4]$, $K_2[Zn(OH)_4]$, ZnO, or the like. The zinc ion source may be used alone or in combination of two or more kinds. The concentration of the zinc ions in the alkaline plating bath is not particularly limited, but may be, for example, about 2 to about 20 g/L, and preferably about 4 to about 12 g/L.

In some embodiments, the plating bath, in particular the alkaline plating bath, further contains, in addition to the zinc ions, additional metal ions forming the zinc alloy film. The additional metal ions are not particularly limited as long as the zinc alloy film can be formed, and may be, for example, at least one selected from the group consisting of nickel ions, iron ions, cobalt ions, tin ions, manganese ions, and the like, and preferably nickel ions. The ion source that brings about the additional metal ions is not particularly limited, and may be, for example, nickel sulfate, ferrous sulfate, cobalt sulfate, stannous sulfate, manganese sulfate, or the like. The additional metal ion source may be used alone or in combination of two or more kinds. The total concentration of the additional metal ions in the alkaline plating bath is not particularly limited, but may be, for example, about 0.4 to about 4 g/L, and preferably about 1 to about 3 g/L.

In some embodiments, the plating bath may contain caustic alkali. The caustic alkali is not particularly limited, but may be, for example, sodium hydroxide or potassium hydroxide. More specifically, when the plating bath is an alkaline plating bath, sodium hydroxide may be contained, and when the plating bath is an acidic plating bath, potassium hydroxide may be contained. The concentration of the caustic alkali in the alkaline plating bath is not particularly limited, but may be, for example, about 60 to about 200 g/L, and preferably about 100 to about 160 g/L.

The conditions of the current flow step are not particularly limited as long as the article can be plated. For example, a current may be allowed to flow at a temperature of about 15° C. to about 40° C. and preferably about 25 to about 35° C. Alternatively, a current may be allowed to flow at a cathode current density of about 0.1 to 20 A/dm$^2$ and preferably 0.2 to 10 A/dm$^2$.

The method of the present invention may further comprise any steps commonly used in the art, as long as the object thereof is not impaired. For example, the method of the present invention may further comprise a step of cleaning the article before the current flow step, a step of cleaning the article after the current flow step, or the like.

In another aspect, the present invention also relates to a system of electroplating an article with metal. The system of the present invention comprises a plating bath containing ions of the metal and an organic compound additive, wherein the plating bath comprises the article as a cathode and a conductive base material as an anode, a part of a surface of the conductive base material is covered with an insulating material, and a remaining part is exposed, and a current flowing portion is dispersedly present in the anode. Each feature of the system of the present invention is as described above with respect to the method of the present invention. In addition, the system of the present invention may further comprise any equipment normally used in the art, as long as the object thereof is not impaired.

In yet another aspect, the present invention also relates to an electroplating method of the present invention, an electrode that can be suitably used for an electroplating system, and a method of preparing the same. The method of preparing an electrode of the present invention comprise the steps of providing a conductive base material having a plurality of holes dispersed therein, immersing the conductive base material in a coating solution containing an insulating material to attach the insulating material to an outer surface of the conductive base material and an inner wall surface of the holes, and peeling off at least a part of the insulating material attached to the outer surface of the conductive base material. In the electrode prepared according to the method of preparing the electrode of the present invention, the inner wall surface of the holes in the conductive base material is covered with the insulating material, and only the outer surface exposed by peeling off the insulating material functions as a current flowing portion. Therefore, as a result, the external dimensions of the conductive base material do not change, but the area of the current flowing portions is reduced, and the current flowing portions are in a dispersed state. That is, the electrode of the present invention comprises a conductive base material whose surface is partially covered with an insulating material, and here, the conductive base material has a plurality of holes dispersed therein, an inner wall surface of the holes is covered with the insulating material, at least a part of an outer surface of the conductive base material is exposed, and current flowing portions are dispersedly present. When the electrode of the present invention is used as an anode for electroplating, it is useful for increasing the anode current density while suppressing an increase in the plating bath voltage. As a result, it is considered that the decomposition of the organic compound additive contained in the plating bath can be suppressed while keeping the current distribution with respect to the cathode stable.

The immersion step in the method of preparing an electrode of the present invention is not particularly limited as long as the insulating material can enter the lumen of the plurality of holes present in the conductive base material, and can be carried out by any means. Even when the conductive base material is a metal having pores such as a porous metal, by immersing this in the coating solution, the coating solution can be impregnated inside the pores of the porous metal and can attach to the inner wall surface of the pores. If the coating solution is sufficient in amount, the lumen of the holes of the conductive material will be filled with the insulating material.

The means of peeling off at least a part of the insulating material attached to the outer surface of the conductive base material is not particularly limited as long as a part of the conductive base material can be exposed. For example, after the immersion step, the conductive base material is taken out from the coating solution and dried by natural drying or room temperature drying, or alternatively, by using a curing agent, the insulating material is cured while being attached to the outer surface of the conductive base material and the inner wall surface of the holes. The cured insulating material attaching to the outer surface of the conductive base material may be peeled off by polishing with a polishing machine such as a file or a sander. That is, in some embodiments, the peeling step may comprise polishing part or all of the outer surface of the conductive base material.

Other features of the electrode of the present invention and the method of preparing the same are as described above with respect to the method of the present invention. In addition, the method of preparing an electrode of the present invention may further comprise any step usually used in the art as long as the object thereof is not impaired.

Hereinafter, the present invention is specifically described with reference to Examples, but the scope of the present invention is not limited to these Examples.

EXAMPLES

Preparation Example 1

A porous nickel plate (64×64×5 mm, "Ni Celmet" manufactured by Sumitomo Electric Industries, Ltd., product number #1) was provided as a conductive base material. This was placed in a mold, and a coating solution containing an epoxy resin (AMAZING DEEP POUR manufactured by ALUMILITE; prepared according to the instruction manual) was poured, which was allowed to stand at room temperature for 48 hours, and the nickel plate was immersed in the coating solution, which was then cured. The nickel plate covered with the cured epoxy resin was taken out from the mold, the entire outer surface thereof was polished with an electric sander, and the cured resin was peeled off to prepare an electrode E1. The right end part and the left end part of the electrode E1 were masked with masking tape (manufactured by Sequoia Manufacturing Corporation, model number SC-1) to prepare electrodes E2 to E4 having different widths in a region in contact with the electrolytic solution. Then, the image of each electrode was analyzed by image analysis software (ImageJ), and the total area of the metallic color portions in the region in contact with the electrolytic solution was calculated as the area of the current flowing portions. At this time, considering that the electrode was to be installed in contact with the inner wall of the electrolytic cell, it was assumed that only one side of the electrode would be in contact with the electrolytic solution, and the height of the portion of the electrode immersed in the electrolytic solution was 50 mm. As comparative examples, the conductive base materials presented in Table 1 below was used to prepare uncoated electrodes C1 to C4. Note that the electrode C2 is obtained by masking a nickel flat plate in the same manner as the electrode E3 to narrow the width of the region in contact with the electrolytic solution.

TABLE 1

Features of Electrode

| Electrode | Conductive Base Material | Dimension (mm) | Coating Treatment | Current Flowing Portion Area (dm$^2$) | Current Flowing Portion Ratio*[1] (%) |
|---|---|---|---|---|---|
| E1 | Porous Nickel Plate | 64 × 64 × 5 | Done | 0.032 | 10 |
| E2 | Porous Nickel Plate | 42 × 64 × 5 | Done | 0.021 | 10 |
| E3 | Porous Nickel Plate | 32 × 64 × 5 | Done | 0.016 | 10 |
| E4 | Porous Nickel Plate | 16 × 64 × 5 | Done | 0.008 | 10 |
| C1 | Nickel Flat Plate | 64 × 64 × 5 | None | 0.320 | 100 |
| C2 | Nickel Flat Plate | 32 × 64 × 5 | None | 0.16 | 100 |
| C3 | Iron Flat Plate | 64 × 64 × 5 | None | 0.320 | 100 |
| C4 | Porous Nickel Plate | 64 × 64 × 5 | None | >>0.320 | >>100 |

*[1] The current flowing portion ratio is a percentage of the ratio of the current flowing portion area of each electrode to the current flowing portion area of a flat plate having the same external dimensions (the outer area of current flowing region).

Test Example 1

In an electrolytic cell (inner size 64×64×55 mm), electrodes E1 to E4 or electrodes C1 to C4 were set as anodes along the inner wall, and an SPCC dull-finish steel plate was set as a cathode, and 160 mL of the electrolytic solution having the composition presented in Table 2 below was added. Each electrode is in contact with the electrolytic solution only on one side thereof, and the back surface, the side surface, and the bottom surface thereof are in contact with the electrolytic cell, so that they are not in contact with the electrolytic solution. The height of the portion of each electrode immersed in the electrolytic solution was 50 mm.

TABLE 2

Composition of Electrolytic Solution

| Component | Concentration |
|---|---|
| NiSO$_4$•6H$_2$O | 7.3 g/L (1.6 g/L as Ni Ions) |
| Caustic Soda | 130 g/L |
| IZ-250YB*[2] | 60 g/L |

*[2] Amine-based chelating agent for zinc nickel alloy plating bath manufactured by Dipsol Chemicals Co., Ltd. (ethylene oxide adduct of alkyleneamine)

A current flow was started with the currents presented in Table 3 below, and the bath voltage at the start of current flow was measured. Then, the temperature of the electrolytic solution was adjusted to 25° C.±3° C. during the current flow, and the current flow was performed until the current flow rate became 130 AWL. Note that the anode current density is a calculation of the current value per unit area of the current flowing portions in the anode. For the electrolytic solution before and after the current flow, the IZ-250YB concentration was measured by ion chromatography, and the sodium carbonate concentration was measured by titration. In addition, the color tone of the electrolytic solution was visually observed. Table 3 presents the results.

TABLE 3

Current Flow Conditions and Test Results

| Electrode | Current (A) | Anode Current Density (A/dm$^2$) | Bath Voltage at Start (V) | IZ-250YB (g/L) | Na Carbonate (g/L) | Color Tone of Electrolytic Solution |
|---|---|---|---|---|---|---|
| E1 | 1.28 | 40 | 3.2 | 42 | 26 | Reddish Purple |
|    | 2.56 | 80 | 4.1 | 51 | 19 | Reddish Purple |
| E2 | 1.28 | 61 | 3.4 | 49 | 22 | Reddish Purple |
| E3 | 1.28 | 80 | 3.5 | 50 | 21 | Reddish Purple |
| E4 | 1.28 | 160 | 3.6 | 52 | 21 | Reddish Purple |
| C1 | 1.28 | 4 | 3.2 | 20 | 41 | Brown |
|    | 2.56 | 8 | 3.9 | 29 | 32 | Brown |
| C2 | 1.28 | 8 | 3.5 | 27 | 32 | Brown |
| C3 | 2.56 | 8 | 3.8 | 30 | 30 | Brown |
| C4 | 2.56 | <<8 | 3.9 | 14 | 46 | Brown |

The IZ-250YB concentration in the electrolytic solution before the current flow was 60 g/L, and the concentration of sodium carbonate was below the detection limit, but when the electrodes C1 to C4 were used, the IZ-250YB concentration was greatly reduced and the sodium carbonate concentration was greatly increased. On the other hand, when the electrodes E1 to E4 were used, the IZ-250YB concentration could be maintained at a high level, and the increase in the sodium carbonate concentration was small. Further, while the electrolytic solution immediately after preparation was purple, it turned brown after the current flow with the electrodes C1 to C4. Meanwhile, it turned magenta after the current flow with the electrodes E1 to E4, and discoloration of the electrolytic solution was suppressed. The discoloration of this electrolytic solution means that IZ-250YB was decomposed and decomposition products (electrolytic waste products) were accumulated. From this point as well, it can be understood that the decomposition of the organic compound additive was successfully suppressed by using the electrodes E1 to E4.

Test Example 2

In order to evaluate the durability of the electrodes E1 to E4, a current was allowed to flow in the same manner as in Test Example 1 except that the current was allowed to flow therethrough for 2000 hours, and the surface of the anode after the current flow was observed with a digital microscope. However, no noticeable damage (dissolution of the electrodes) was observed in the electrodes E1 to E4, and if present, it was within the allowable range. Further, the bath voltage after the current flow when the electrodes E1 to E4 were used was 3.2 V, 3.4 V, 3.6 V, and 4.9 V, respectively, which were within the allowable range. In particular, when the electrodes E1 to E3 were used, the increase in bath voltage was suppressed. From these, it was found that the durability of the electrodes E1 to E4 was good, the durability of the electrodes E1 to E3 was particularly excellent, and the durability of the electrode E1 was extremely excellent.

Preparation Example 2

An electrode E5 (current flowing portion area less than 0.320 dm$^2$) and an electrode E6 (current flowing portion area 0.021 dm$^2$, current flowing portion ratio 7%) were prepared in the same manner as the electrode E1 except that a stainless mesh (64×64×1 mm) or iron grating (64×64×5) was used instead of the porous nickel plate.

Test Example 3

A current was allowed to flow and evaluation was performed under the conditions presented in Table 4 in the same manner as in Test Example 1 except that the electrodes E5 and E6 were used as the anodes. Table 4 presents the results.

TABLE 4

Current Flow Conditions and Test Results

| Electrode | Current (A) | Anode Current Density (A/dm$^2$) | Bath Voltage at Start (V) | IZ-250YB (g/L) | Na Carbonate (g/L) | Color Tone of Electrolytic Solution |
|---|---|---|---|---|---|---|
| E5 | 2.56 | >>8 | 4.1 | (Unmeasured) | (Unmeasured) | Reddish Purple to Brown |
| E6 | 1.28 | 61 | 3.5 | 46 | 21 | Reddish Purple |

It was understood that after the current flow with the electrodes E5 or E6, the discoloration of the electrolytic solution was suppressed as compared with the current flow with the electrodes C1 to C4, and the decomposition of the organic compound additive was suppressed. In fact, when the IZ-250YB concentration and the sodium carbonate concentration after using the electrode E6 were measured, the former was maintained at a high level and the latter was maintained at a low level.

Preparation Example 3

A pinholder with iron nails was prepared as a conductive base material. Specifically, holes were made in the iron flat plate, and 99 iron nails (shaft diameter 1.65 mm, length 5 mm) were evenly distributed and installed, and the iron nails and the iron plate were soldered. This was placed in a mold, a coating solution containing an epoxy resin (AMAZING DEEP POUR manufactured by ALUMILITE, prepared according to the instruction manual) was poured, which was allowed to stand at room temperature for 48 hours to cure the coating solution. The pinholder with the tips of all the iron nails filled in due to the cured coating solution was taken out of the mold, and the entire outer surface was polished with an electric sander until the entire diameter of the shaft portions of the iron nails was exposed to thereby prepare an electrode E7 (current flowing portion area 0.021 dm$^2$, current flowing portion ratio 7%) having a spot-shaped current flowing portion. Further, an electrode E8 (current flowing portion area 0.009 dm$^2$, current flowing portion ratio 3%) was prepared in the same manner as the electrode E7 except that iron nails having a shaft portion diameter of 1.07 mm were used. An electrode E9 (current flowing portion area 0.006 dm$^2$, current flowing portion ratio 2%) was prepared in the same manner as the electrode E7 except that the number of iron nails was 28.

Test Example 4

A current was allowed to flow and evaluation was performed under the conditions presented in Table 5 in the same manner as in Test Example 1 except that a short hull cell container was used as the electrolytic cell, 250 mL of electrolytic solution was added thereto, and the electrodes E7 to E9 were used as the anodes, and the current flow was performed until the current flow rate became 235 Ah/L. Table 5 presents the results.

TABLE 5

Current Flow Conditions and Test Results

| Elec-trode | Current (A) | Anode Current Density (A/dm$^2$) | Bath Voltage at Start (V) | IZ-250YB (g/L) | Na Carbonate (g/L) | Color Tone of Electrolytic Solution |
|---|---|---|---|---|---|---|
| E7 | 1.25 | 60 | 3.2 | 36 | 20 | Reddish Purple |
| E8 | 1.25 | 139 | 3.4 | 39 | 17 | Reddish Purple |
| E9 | 1.25 | 208 | 3.7 | 45 | 16 | Reddish Purple |

When the electrodes E5 or E6 were used, the IZ-250YB concentration could be maintained at a high level, and the increase in the sodium carbonate concentration was small. Further, after the current flow with these electrodes, discoloration of the electrolytic solution was suppressed as compared with after the current flow with the electrodes C1 to C3.

From the above, it has been found that it is possible to suppress the decomposition of organic compound additives in a plating bath if, when electroplating an article with metal, a conductive base material is used as the anode, part of the surface of which is covered with an insulating material but the remaining part is exposed.

The invention claimed is:

1. A method of electroplating an article with metal, comprising the step of:
    allowing a current to flow in a plating bath containing ions of the metal and an organic compound additive wherein the plating bath is an alkaline plating bath,
    wherein
        the plating bath comprises the article as a cathode and a conductive base material as an anode wherein the conductive base material comprises at least one selected from the group consisting of nickel, iron, stainless steel, and carbon,
        a part of a surface of the conductive base material is covered with an insulating material, and a remaining part is exposed, and
        a current flowing portion is dispersedly present in the anode,
    wherein
        the conductive base material comprises a porous metal, a perforated steel plate, or a perforated folded plate, the conductive base material has a plurality of holes each comprising a lumen, and the lumen of the holes in the conductive material is filled with the insulating material.

2. The method according to claim 1, wherein an outer surface of the conductive base material is covered with a layer of the insulating material having a plurality of missing portions dispersed therein.

3. The method according to claim 1, wherein the insulating material comprises at least one selected from the group consisting of resins and rubbers.

4. The method according to claim 1, wherein the metal comprises zinc.

5. The method of claim 1, wherein the anode is insoluble in the alkaline plating bath.

* * * * *